(No Model.)

A. A. WRIGHT.
HOOK AND EYE.

No. 466,857. Patented Jan. 12, 1892.

WITNESSES:
John Buckler,
W. H. Weightman

INVENTOR
A. A. Wright,
BY A. M. Pierce.
ATTORNEY.

UNITED STATES PATENT OFFICE.

ALFRED A. WRIGHT, OF MONTCLAIR, NEW JERSEY.

HOOK AND EYE.

SPECIFICATION forming part of Letters Patent No. 466,857, dated January 12, 1892.

Application filed July 20, 1891. Serial No. 400,049. (No model.)

*To all whom it may concern:*

Be it known that I, ALFRED A. WRIGHT, a citizen of the United States, residing at Montclair, in the county of Essex and State of New Jersey, have invented a new and useful Improvement in Hooks and Eyes, of which the following is a specification.

My invention relates especially to the construction and arrangement of hooks and eyes, and has for its object the provision of a hook and eye, of simple and cheap construction, which when caught together will not become disconnected.

To attain the desired end my invention consists, essentially, in a hook broader in cross-section than the eye and having the two portions of the shank slightly separated, all of which will be hereinafter first fully described, and then pointed out in the claims.

Figure 1:
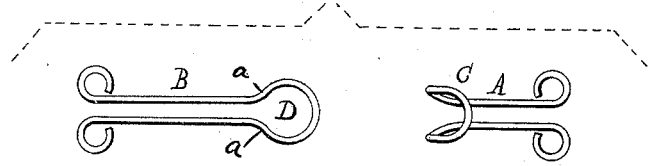
Figure 2:
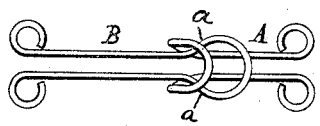
Figure 4:
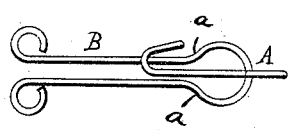
Figure 3:
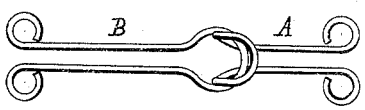
Figure 5:
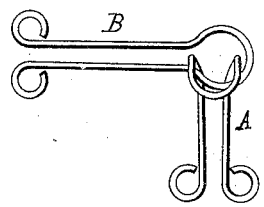

In the accompanying drawings, upon an enlarged scale, Figure 1 shows the hook and eye disconnected. Fig. 2 shows the two parts connected by passing the eye through the hook. Fig. 3 shows the parts connected by passing the hook through the eye. Fig. 4 illustrates the method of passing the eye through the hook, and Fig. 5 of passing the hook through the eye.

Like letters of reference, wherever they occur, indicate corresponding parts in all the figures.

A is the hook, and B the eye, the latter being formed with shoulders *a* between its aperture and shank. The hook is made broader at C than the opening D in the eye. (See Fig. 1.) By this construction I furnish a hook and eye which will not disconnect themselves when employed upon a garment, as is often the case with those heretofore used, while at the same time my hook and eye are easy to connect and disconnect, and two different lengths of clasp are provided, both of which are secure against accidental displacement.

As illustrated in Figs. 2 and 4, in uniting the hook and eye the eye is turned edgewise, passed between the two portions of the shank of the hook, and then turned, as in Fig. 2. This furnishes one length of clasp, and the hook and eye cannot be disconnected excepting by a reverse movement of the parts.

In Fig. 3 the hook is passed through the eye, and this is accomplished by turning the hook at right angles to the eye, passing it through the eye, and then turning it to the position shown in Fig. 3, thereby furnishing a clasp of greater extension than that described in the foregoing paragraph. It will thus be seen that my improved hook and eye admirably answers the uses and purpose for which it is intended, and when once connected together the parts will not automatically disconnect.

Having now fully described my invention, what I claim as new therein, and desire to secure by Letters Patent, is—

1. The combination of a hook and eye, the former having its shanks spread to admit the eye and adapted to hold the eye between the point and shank of the hook, and the eye having an elongated shank and shoulders *a* and being adapted to pass between said shanks and engage the hook by said shoulders or to receive and retain the hook when the latter is passed through its aperture, substantially as set forth.

2. The combination of a hook and eye, the end of the hook proper being of greater width than the aperture of the eye and having its shanks separated, and the eye having shoulders *a* and being adapted to pass between said shanks and engage the hook by said shoulders or to receive and retain the hook when the latter is passed through its aperture, substantially as set forth.

ALFRED A. WRIGHT.

Witnesses:
J. T. BRADLEY,
J. S. ROCHE.